Jan. 15, 1957

A. M. STRAHM 2,777,164

INJECTION MOULDING MACHINE

Filed Jan. 7, 1954

Inventor
André Strahm
By Ernesto Montague
Attorney

2,777,164
INJECTION MOULDING MACHINE

André M. Strahm, Villeneuve, Switzerland

Application January 7, 1954, Serial No. 402,735

2 Claims. (Cl. 18—30)

The present invention concerns machines for the injection moulding of annular objects from thermoplastic material; in particular, the invention concerns injection moulding machines of the kind comprising an injection head and one or more moulds having shaped cavities intended to be filled successively by thermoplastic material expelled from the said head.

A machine according to the present invention is characterised by the fact that the or each said mould is furnished with a core reciprocal in relation to the remainder of the mould and adapted to be displaced from a protruding position, in which one of its end plugs an injection aperture in the mould, to a withdrawn position in which the said aperture is uncovered, the injection head having an injection pipe and means being provided for keeping the core in contact with the said pipe during its withdrawal from the mould in order that the said injection aperture should be closed by the core from the time of the withdrawal of the injection pipe, whereby the so-closed mould may be removed from beneath the injection head before the setting of the material which fills it.

Figure 1:
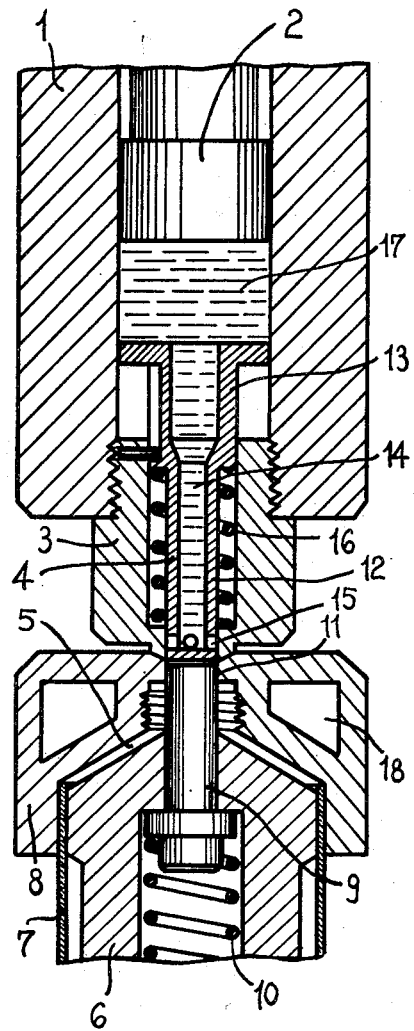
Figure 2:
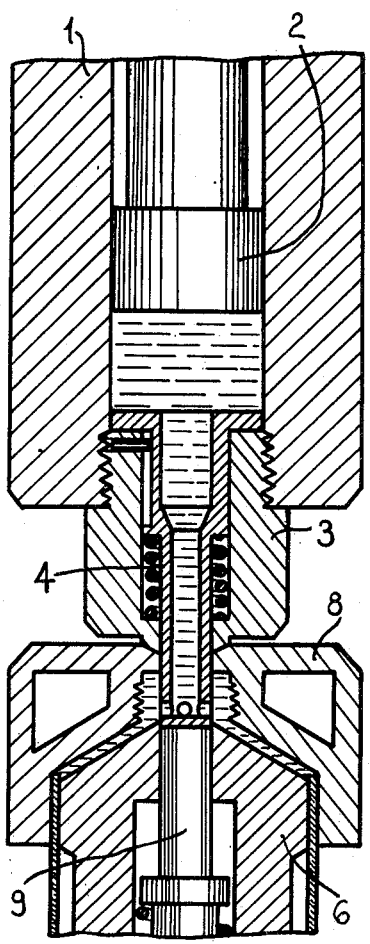

The accompanying drawings represent, by way of example, an embodiment of an injection moulding machine in accordance with this invention, Figures 1 and 2 being fragmentary views, in axial section, of the injection head and of a mould of this machine in two different stages of operation of the latter.

The machine illustrated in the drawings is particularly intended for moulding the annular head of a collapsible tube of polyethylene and comprises an injection head constituted by a cylinder 1 in which a piston 2 is reciprocable, the bottom end of cylinder 1 being closed by a screw-threaded plug 3 in which a reciprocable injection pipe 4 is housed.

A mould, which has a cavity 5 of a shape corresponding to that of the tube head to be moulded and which is intended to receive molten thermoplastic material from the said injection head, is constituted by a mandrel 6, on which is threaded the cylindrical body 7 of a collapsible tube of extruded polyethylene and on which a head is to be moulded, and by a cap 8 that covers the said mandrel and surrounds the top end of the body 7 of the tube. The cap 8 consists of two parts which are separated from each other along an axial plane and each of which has chambers 18 intended for the circulation of a cooling liquid.

The mould has, in addition, a core 9 which is reciprocable axially within the mandrel 6 and which constitutes, in its protruding position represented in Figure 1, an end part of the mandrel 6 intended to reserve an axial conduit in the head of the tube.

The said core 9 is reciprocable in an axial bore in the mandrel 6, and a spring 10, housed in a recess in the latter, tends to keep the core in its protruding position, its top end then passing into and closing an axial injection aperture 11 in the cap 8.

The injection pipe 4 has a cylindrical tip 12 of the same diameter as the core 9 and a rear part 13 of greater diameter, both parts being guided in bores which are coaxial with the plug 3 of the injection head. An axial conduit 14 passes through the greater part of the length of the injection pipe 4 which has, very near its tip, four radial passages 15 which open, on the one hand, into the front end of the axial conduit 14 and, on the other hand, on the cylindrical surface of the tip 12 of the pipe. A helical spring 16 between the plug 3 and the pipe 4 tends to keep the latter in its withdrawn position in relation to the injection head as shown in Figure 1, in which position any flow of molten thermoplastic material 17 contained in the cylinder of the injection head is prevented owing to the fact that the orifices of the conduits 15 are covered by the front part of the bore of the plug 3.

In order to effect the injection, the mould and the injection head are first brought into the coaxial position represented in the drawings and the molten material 17 contained in the cylinder 1, which is heated by means which are not shown, is put under pressure by the piston 2. The increase of pressure thus produced has the effect of driving downwards the pipe 4, the tip 12 of which meets the core 9 and pushes the latter inside the mandrel 6, in opposition to the action of the spring 10, to the position shown in Figure 2. As soon as the orifices of the radial passages 15 are uncovered, the molten material flows into the shaped cavity of the mould and fills the latter.

When the cavity 5 is filled, the piston 2 is withdrawn and, as the result of the diminution of pressure in the cylinder 1, the pipe 4 and the core 9, under the action of the springs 10 and 16, return to their initial position represented in Figure 1, the core being kept in contact with the pipe during the withdrawal of the latter. The injection aperture 11 of the mould is then plugged by the top end of the core 9 and the orifices of the radial passages 15 of the pipe are stopped by the plug 3.

The closed mould can then be withdrawn without waiting for the material which fills it to set, and can be replaced, beneath the injection head, by another identical mould with a view to effecting the next injecting operation.

It has been found that the employment of an injection head and of moulds such as represented enables the rate of working of automatic injection moulding machines used for moulding the heads of collapsible tubes to be substantially increased. As a matter of fact, the practically instantaneous injection of the molten material through the relatively hot pipe 4 which passes deeply into the cavity of the mould enables a good welding of the moulded head on to the body of the tube to be obtained even if the temperature of the material is substantially lower than when it is injected through a central flow hole in the cap of the mould and from which the material has to travel over a relatively long distance between the cap and the end of the mandrel before coming into contact with the rest of the body of the tube. On the other hand, the withdrawal of the pipe can be effected without difficulty as soon as the injection is finished, without waiting for the setting of the material filling the cavity of the mould, the arrival of the relatively cold core 9, which has the same section as the pipe tip 12, in place of the latter contributing, in addition, to the cooling of the moulded head.

Although these two features enable the setting time of the injected head to be considerably reduced, the principal advantage of the arrangement represented lies in the fact that the injection aperture of the mould is automatically plugged by the core 9 on the withdrawal of the pipe tip 12 and that the mould thus closed can be removed from beneath the injection head before the material that fills it has set.

Consequently, the setting time of the thermoplastic material no longer fixes the period of rest of the mould beneath the injection head, and the rate of replacement of the moulds, which is fixed solely by the period of the injection proper, can be greatly accelerated.

In this connection, it should be pointed out that tests made on a machine of the kind represented have shown that the moulding of heads of collapsible tubes of the conventional shape could be carried out easily in an extremely short time, which was less than a third or even a quarter of the time necessary for setting. The rate of filling of the moulds can thus be trebled or quadrupled in relation to the rate obtained by machines having moulds which remain open and in which the injection pressure has to be maintained for at least the greater part of the setting time.

Thus the arrangement represented has the following advantages: the temperature and pressure of injection are reduced owing to the passage of the pipe 4 into the mould; the period of engagement of the injection head with a mould is reduced owing to the automatic closing of the mould, so that it is possible to fill the moulds at a greater rate than when the injection pressure has to be maintained with engagement between the mould and the injection head until the end of the setting time.

A machine in accordance with this invention may, of course, comprise a plurality of injection heads intended for simultaneously filling different moulds which are arranged, for example, on a single indexing device, it also being possible for the injection head to have more than one pipe so as to be capable of filling a plurality of moulds simultaneously in the course of a single injection.

The invention is not limited to machines intended for the injection of heads of tubes of polyethylene but, on the contrary, may also be applied to the moulding of any other annular article either of polyethylene or of any other thermoplastic material.

I claim:

1. An injection moulding machine comprising a stationary injection head comprising a cylinder and a piston reciprocating in said cylinder, the said piston being adapted to press the moulding material disposed in said cylinder out of the latter, a hollow injection pipe disposed in one end of said cylinder opposite said piston and movable by means of said piston, the said injection pipe constituting a conduit for said moulding material, the said injection pipe being displaceable momentarily from a withdrawn position in said cylinder to an advanced position relative to said cylinder, a mould comprising a mandrel and a cap defining a moulding cavity with said mandrel, said cap having a central opening, a core disposed in said mandrel for axial movement therein, resilient means for maintaining said core in an advanced position relative to said mandrel and one end of said core penetrating said central opening of the cap and closing up the latter, said injection pipe having at one end a cross section identical with that of said core and the end face of the latter engages the end face of said injection pipe by means of said resilient means, said injection pipe pushing back said core against the action of said resilient means into said mandrel and penetrating through the central opening of said cap into said moulding cavity in its advanced position, thereby closing up the central opening of said cap, openings disposed at the extreme end of said injection pipe for feeding said moulding material into the moulding cavity, and said core assuming again its advanced position in the central opening of said cap upon filling said moulding cavity with moulding material and withdrawal of said piston in said cylinder.

2. The machine, as set forth in claim 1, which includes a plug connected with said injection head and having guide means for said injection pipe, and resilient means disposed in said plug for retaining said injection pipe in withdrawn position in said cylinder, and the rear end of said injection pipe formed as a second piston reciprocating in said cylinder by operation of said first mentioned piston.

References Cited in the file of this patent

UNITED STATES PATENTS

| 2,358,857 | Gits | Sept. 26, 1944 |
| 2,471,148 | Gale et al. | May 24, 1949 |

FOREIGN PATENTS

| 54,793 | Netherlands | June 15, 1943 |